United States Patent
Cheung et al.

(10) Patent No.: US 12,278,558 B2
(45) Date of Patent: Apr. 15, 2025

(54) POWER STAGE ADAPTIVE DEADTIME AND DRIVE STRENGTH

(71) Applicant: Renesas Electronics America Inc., Milpitas, CA (US)

(72) Inventors: Chun Cheung, Bridgewater, NJ (US); Ankit Sharma, Raritan, NJ (US); Bo Wang, Easton, PA (US)

(73) Assignee: Renesas Electronics America Inc., Milpitas, CA (US)

( * ) Notice: Subject to any disclaimer, the term of this patent is extended or adjusted under 35 U.S.C. 154(b) by 225 days.

(21) Appl. No.: 17/965,206

(22) Filed: Oct. 13, 2022

(65) Prior Publication Data

US 2024/0128858 A1 Apr. 18, 2024

(51) Int. Cl.
  *H02M 1/38* (2007.01)
  *H02M 1/08* (2006.01)
  *H02M 3/158* (2006.01)

(52) U.S. Cl.
  CPC ............. *H02M 1/385* (2021.05); *H02M 1/08* (2013.01); *H02M 3/158* (2013.01)

(58) Field of Classification Search
  CPC .... H02M 3/156; H02M 3/158; H02M 3/1588; H02M 3/155; H02M 3/1582; H02M 3/157; H02M 3/1563; H02M 3/1584; H02M 3/32; H02M 1/081–084; H02M 1/0006; H02M 2003/1566; H02M 2003/1557; H02M 2001/0012; H02M 2001/0009; H02M 2001/385
  See application file for complete search history.

(56) References Cited

U.S. PATENT DOCUMENTS

| | | | | |
|---|---|---|---|---|
| 5,841,643 A | * | 11/1998 | Schenkel | H02M 3/33507 363/21.16 |
| 10,483,849 B1 | * | 11/2019 | Saleem | H02M 3/1584 |
| 2015/0256074 A1 | * | 9/2015 | Biondi | H02M 3/158 323/271 |
| 2016/0268900 A1 | * | 9/2016 | Miyazaki | H02M 1/088 |
| 2020/0313539 A1 | * | 10/2020 | Hall | H02M 1/4233 |

* cited by examiner

*Primary Examiner* — Bryan R Perez
(74) *Attorney, Agent, or Firm* — SCULLY, SCOTT, MURPHY & PRESSER, P.C.

(57) ABSTRACT

Methods and systems for operating a voltage regulator are described. A integrated circuit can be configured to adjust at least one of a deadtime parameter and a drive strength parameter of a power stage based on at least one of an input voltage being provided to a power stage, a switch node voltage of the power stage, and an output current of the power stage. A controller of the power stage can be further configured to adjust a deadtime of the power stage based on adjustment of the deadtime parameter. The controller can be further configured to adjust a drive strength of the first driver and the second driver based on adjustment of the drive strength parameter.

17 Claims, 7 Drawing Sheets

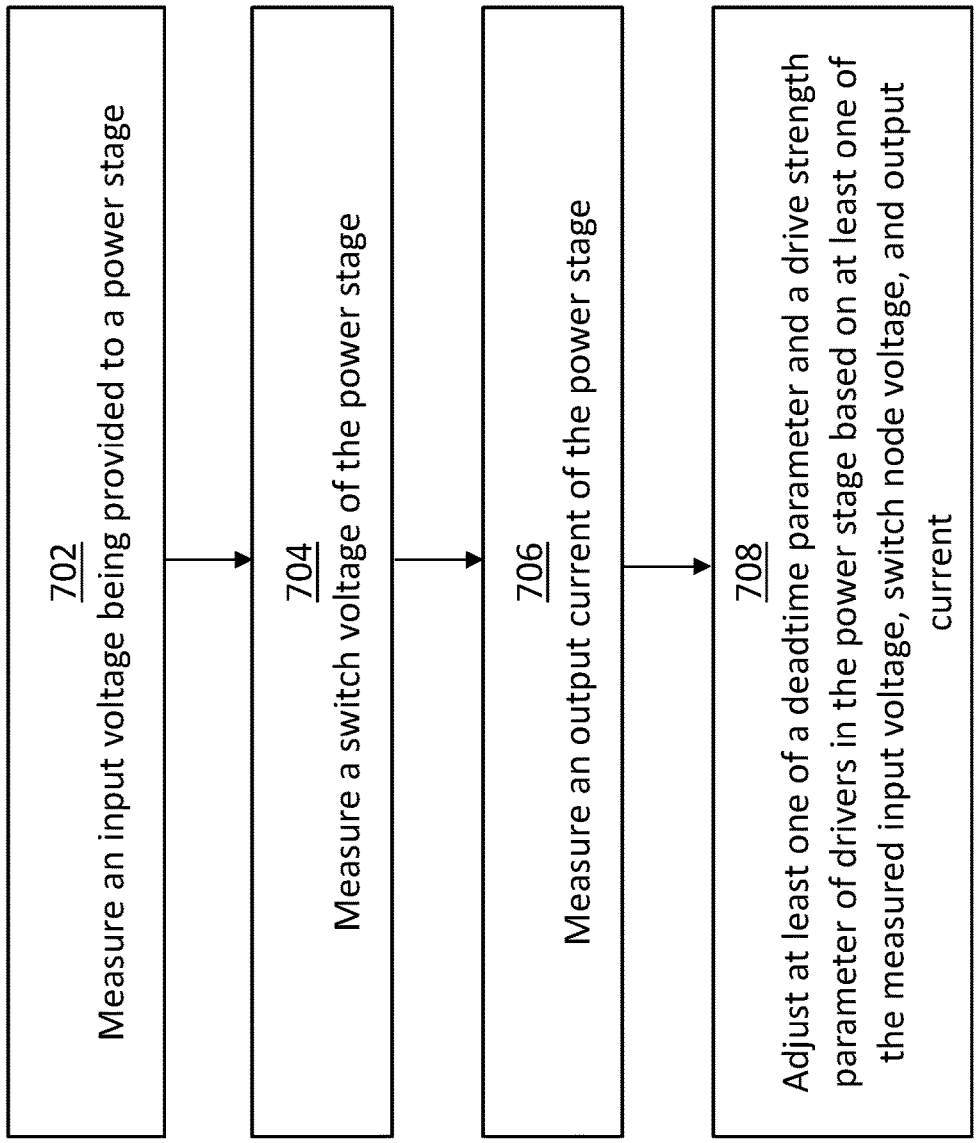

POWER STAGE ADAPTIVE DEADTIME AND DRIVE STRENGTH

BACKGROUND OF THE SPECIFICATION

The present disclosure relates in general to operations of power stages. More specifically, the present disclosure relates to adaptive deadtime and drive strength in power stages.

DC-to-DC voltage conversion may be performed by switching voltage regulators or power converters to convert a voltage from a higher level to a lower level that may be required by a load. An example architecture may distribute the higher voltage to multiple voltage regulators or power stages, and each voltage regulator may produce a same or different voltages for one or more loads. A switching voltage regulator may use two or more power transistors to convert energy from one voltage to another voltage. One example of such a switching voltage regulator may be the Buck Regulator, which typically switches a pair of power transistors to produce a square-wave at a common node between the pair of power transistors. The produced square-wave may be smoothed out using a resonant circuit (e.g., an inductor-capacitor (LC) circuit) to produce a desired voltage for a load. A feedback control loop may be configured to control a duty-cycle of the produced square-wave and a resulting value of an output voltage of the voltage converter.

An example voltage regulator architecture is a multiphase voltage regulator which includes several phases. Each phase includes a power stage and an inductor. All phases share a controller and the output capacitors. The controller generates PWM signals to the power stages to control the FETs turn-on and off. The duty cycle of the PWM signals can be adjusted by the controller to obtain the target output voltage. The phases are connected in parallel, the turn-on of the phases can be interleaved to reduce the output current ripple, output voltage ripple and input current ripple to improve system performance. Each Power Stage includes a power transistors pair and a power stage controller. The power stage controller can measure some critical parameters (e.g. current and temperature) and feed back to the controller to help optimize the system performance such as current balance, efficiency and load transients. In addition, power stage controller can also adjust some critical parameters (e.g. dead time, and driver strength) to optimize the system performance (ringing and efficiency).

SUMMARY OF THE INVENTION

In one embodiment, an apparatus for operating a voltage regulator is generally described. An integrated circuit can be configured to adjust at least one of a deadtime parameter and a drive strength parameter of the power stage based on at least one of an input voltage being provided to a power stage, a switch node voltage of the power stage, and an output current of the power stage. A controller can be configured to adjust a deadtime of the power stage based on adjustment of the deadtime parameter. The controller can be further configured to adjust a drive strength of drivers in the power stage based on adjustment of the drive strength parameter.

In one embodiment, a system for operating a voltage regulator is generally described. The system can include a first driver configured to drive a high side transistor of a power stage and a second driver configured to drive a low side transistor of the power stage. The system can further include a controller configured to adjust at least one of a deadtime parameter and a drive strength parameter of the power stage based on at least one of an input voltage being provided to a power stage, a switch voltage of the power stage, and an output current of the power stage. The controller can be further configured to adjust a deadtime of the power stage based on adjustment of the deadtime parameter. The controller can be further configured to adjust a drive strength of the first driver and the second driver based on adjustment of the drive strength parameter.

In one embodiment, a method for operating a voltage regulator is generally described. The method can include measuring an input voltage being provided to a power stage. The method can further include measuring a switch node voltage of the power stage. The method can further include measuring an output current of the power stage. The method can further include adjusting at least one of a deadtime parameter and a drive strength parameter of the power stage based on at least one of the measured input voltage, switch node voltage, and output current.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

BRIEF DESCRIPTION OF THE DRAWINGS

FIG. 7 is a flowchart of another example process that may implement power stage adaptive deadtime and drive strength in one embodiment.

DETAILED DESCRIPTION

Some of the critical measures of system performance can include ringing and efficiency. Ringing can directly affect the FET voltage stress. Lower ringing and higher efficiency can improve system reliability and lifetime. Dead time is one of the parameters which affect efficiency, the impact could be significant especially at high frequency or high current operations. The systems, apparatus, and methods described herein can improve ringing and efficiency. In an aspect, ringing can increase with increasing input voltage. The systems, apparatus, and methods described herein can adjust driver strength to maintain low ringing at varying input voltages. Further, dead time can change with the adjustment to drive strength, and the systems, apparatus, and methods described herein can adjust dead time with changes in drive strength to optimize efficiency at light load and full load. The systems, apparatus, and methods described herein can adjust dead time according to different driver strength and load current to improve efficiency.

Figure 1:
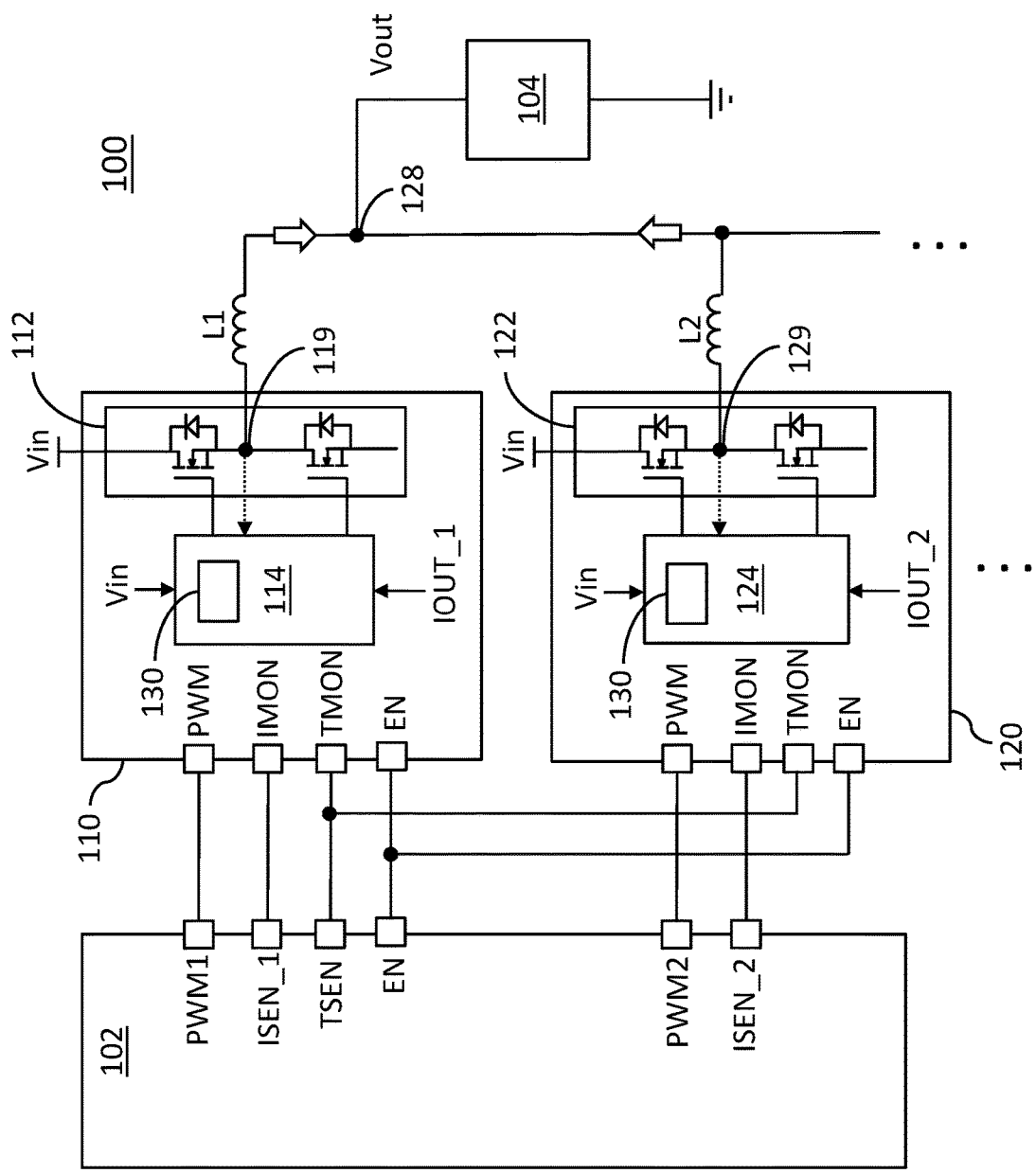
FIG. 1 is a diagram showing an example system that can implement power stage adaptive deadtime and drive strength in one embodiment.

FIG. 1 is a diagram showing an example system 100 that can implement power stage adaptive deadtime and drive strength in one embodiment. System 100 may be an apparatus implementing a multiphase voltage regulator including a controller 102 and at least one voltage regulators or power stages, such as a power stage 110 and a power stage 120. In an example, controller 102 may be a master controller, or a multiphase controller, and power stages 110, 120 may include DC-DC converters. Controller 102 may be configured to control power stage 110 using a pulse width modulation (PWM) signal PWM1 being sent from controller 102 to a PWM pin of power stage 110. Power stage 110 can include a power transistor pair 112 and a power stage controller 114. Power transistor pair 112 can include a high side field-effect transistor (FET) and a low side FET. PWM signal PWM1 can be a control signal that switches power transistor pair 112 to convert an input voltage Vin into an output voltage Vout. Power stage controllers 114, 124 can include gate drivers configured to drive power transistor pairs 112, 122 of power stages 110, 120, respectively.

Controller 102 may be configured to control power stage 120 using another PWM signal PWM2 being sent from the controller 102 to a PWM pin of power stage 120. Power stage 120 may include a power transistor pair 122 and a power stage controller 124. Power transistor pair 122 may include a high side FET and a low side FET. PWM signal PWM2 can be a control signal that switches power transistor pair 122 to convert input voltage Vin into an output voltage Vout. The interleaving of the phases (e.g. PWM1 and PWM2) reduces the total output current ripple and hence reduces the output voltage ripple.

Power stages 110, 120 are smart power stage (SPS) devices configured to perform voltage regulation with additional features such as feedback control based on feedback voltage and/or other parameters such as temperature and inductor current, measured as the outputs of the power stages in the system 100. These parameters will be fed back to the controller 102 for various control implementations. For example, power stages 110, 120 can provide operating temperatures of the power stages 110, 120 from the TMON pin of power stages 110, 120 to a TSEN pin of the controller 102. In another example, power stages 110, 120 can measure inductor currents of the inductors L1, L2, respectively. Power stages 110, 120 can provide the measured inductor current to the controller 102 from their IMON pins of power stages 110, 120 to the ISEN_1 and ISEN_2 pins of controller 102, respectively.

In an aspect, power stage controllers 114, 124 of power stages 110, 120 can be configured to process the measured parameters of power stages 110, 120, respectively, before providing the measured parameters to controller 102. For example, power stage controllers 114, 124 can amplify and/or calibrate the measured parameters prior to providing them to the controller 102. In an aspect, power stage can also utilize the measured parameters to optimize parameters such as driver strength and dead time in power stage to improve system performance.

In an aspect, driver strength can be a parameter that determines how fast the FETs can be switched on and off, and the driver strength can affect FET voltage ringing. Low voltage ringing may be required to reduce FETs voltage stress and improve reliability. The driver strength parameters are typically set to values which can obtain low ringing while maintaining good efficiency. However, when input voltage VIN varies, FET ringing increases with increasing VIN. In order to keep the ringing within an acceptable or a safe range, a power stage controller needs to adjust the driver strength based on the measured VIN to reduce ringing (adaptive driver strength).

In an aspect, a deadtime is a duration of time between two events in system 100. For example, the high side FET and low side FET of power transistor pair 112 can be switched on alternately and a deadtime can occur between the switching (e.g., when both FETs are off). The amount of deadtime can affect system efficiency, reliability and lifetime of power converters. In an aspect, lower deadtime can improve an efficiency of system 100. However, for situations where load 104 is a relatively light load (e.g., drawing current lower than half of peak-to-peak inductor current ripple), the lowered deadtime can lower the efficiency of system 100. Therefore, different dead time is needed to obtain best efficiency at all loads. The power stage controller will detect the load current and then choose dead time accordingly to optimize dead time and system efficiency. In an aspect, when driver strength changes with VIN, dead time may need to be adjusted to avoid shoot-through and to optimize efficiency.

To be described in more detail below, power stage controllers (e.g., controllers 114, 124) can include an integrated circuit (IC) 130 configured to optimize efficiency of system 100 by adaptively adjusting deadtime parameter based on an inductor current, or a switch voltage at a switch node, such as a switch node 119 of power stage 110 or a switch node 129 of power stage 120. Further, IC 130 can optimize drive strength parameter of drivers for the power transistor pairs 112, 122 to reduce voltage ringing by adaptively adjusting the drive strength based on Vin, and further adjust the deadtime based on the adjusted drive strength. Controllers 114, 124 can use the deadtime and/or drive strength parameters adjusted by IC 130 to modify PWM signals being used for driving their corresponding power transistor pairs 112, 122. Hence, FET voltage ringing and efficiency of system 100 can be optimized based on the adaptive adjustments to the deadtime and/or the drive strength parameters.

Figure 2:
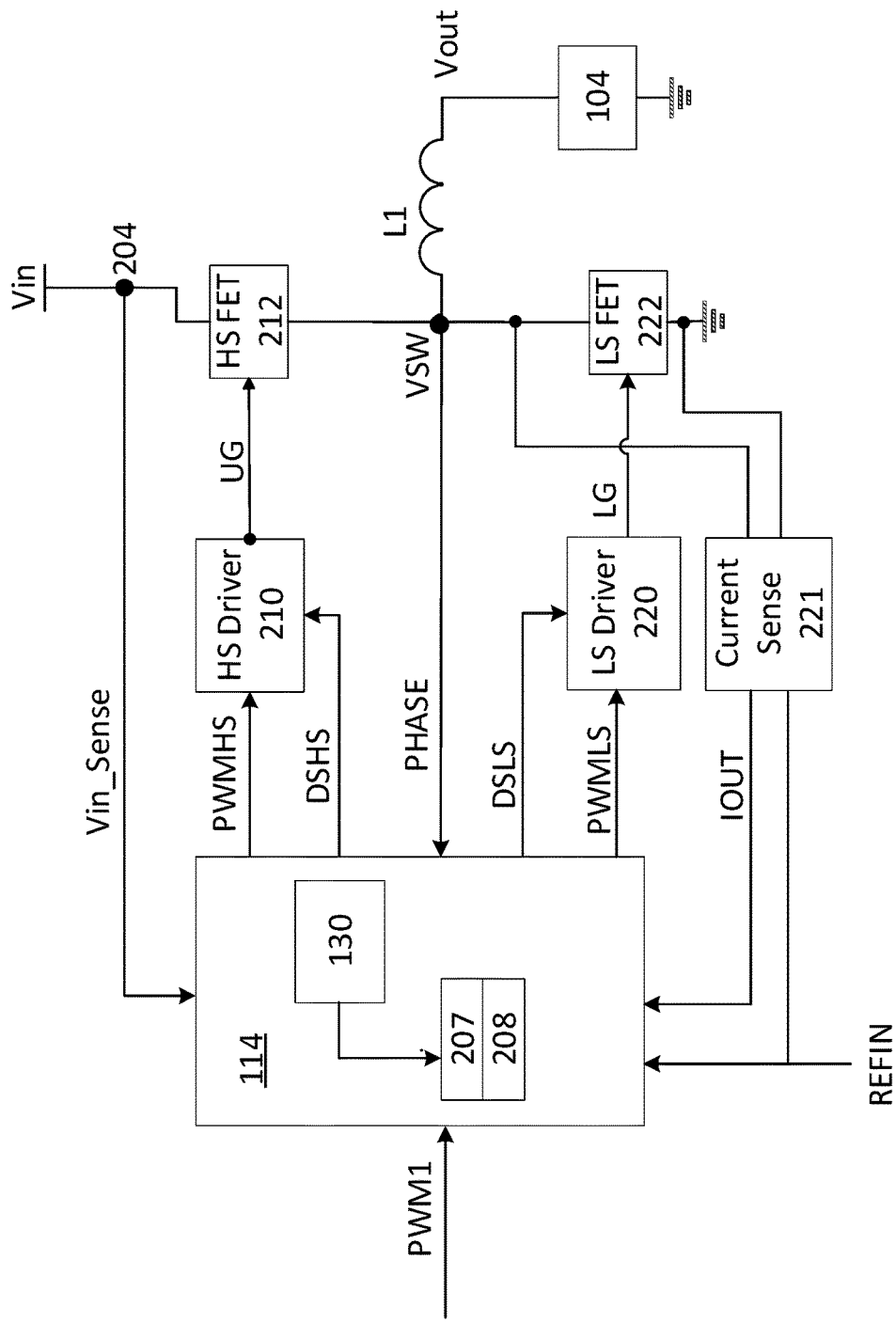
FIG. 2 is a diagram showing additional details of the system of FIG. 1 in one embodiment.

FIG. 2 is a diagram showing additional details of the system of FIG. 1 in one embodiment. The example shown in FIG. 2 can be applicable to power stage 110 and power stage 120 shown in FIG. 1, or other power stage (that are not shown) connected to controller 102 of system 100 in FIG. 1. Controller 114 of power stage 110 can receive PWM signal PWM1 from controller 102. Controller 114 can include PWM logic configured to generate a PWM signal labeled as PWMHS and a PWM signal PWMLS. PWMHS, PWMLS can be converted from PWM1 based on a deadtime parameter set from IC 130. Controller 114 can distribute signal PWMHS to a high side driver (HS driver) 210, and can distribute signal PWMLS to a low side driver (LS driver) 220. HS driver 210 can generate a drive signal UG using PWMHS, and can use drive signal UG to drive a gate of a high side FET (HS FET) 212. LS driver 220 can generate a drive signal LG using PWMLS, and can use drive signal LG to drive a gate of a low side FET (LS FET) 222. Controller 114 can be further configured to generate drive strength signals DSHS and DSLS. Controller 114 can send DSHS to HS driver 210, and HS driver 210 can drive HS FET 212 at a rate specified by DSHS. Controller 114 can send DSLS to LS driver 220, and LS driver 220 can drive LS FET 222 at a rate specified by DSLS. HS FET 212 and LS FET 222 can be the pair of transistors in power transistor pair 112 shown in FIG. 1.

Controller 114 can monitor input voltage Vin by measuring a voltage Vin_Sense from a node 204 between Vin and HS FET 212. Controller 114 can further monitor inductor current by sensing the drain-source voltage of LS FET 222 and then generating a voltage signal IOUT. A difference between a reference voltage REFIN and the voltage of IOUT (e.g., IOUT−REFIN) can be proportional to the current flowing through LS FET 222. Controller 114 can further monitor a switch voltage PHASE measured from switch node VSW (or node 119 in FIG. 1) at the drain of LS FET 222. Switch node voltage PHASE can be a voltage drop across low side FET 222.

In one embodiment, controller 114 can be configured to set a deadtime parameter 207 to program pulse widths of PWMHS and PWMLS. Deadtime parameter 207 can be a variable defining a deadtime of power stage 110. Controller 114 can read or decode deadtime parameter 207 and adjust signals PWMHS and/or PWMLS to modify deadtime between signal events, such as between ON states (e.g., HIGH) of HS FET 212 and LS FET 222. In one embodiment, controller 114 can be further configured to set a drive strength parameter 208 to program the rate being used by HS driver 210 and LS driver 220 to drive HS FET 212 and LS FET 222, respectively. Drive strength parameter 208 can be a variable defining a drive strength of HS driver 210 and LS driver 220. Controller 114 can further read or decode drive strength parameter 208 and adjust DSHS and DSLS to program drive strengths of HS driver 210 and LS driver 220.

In one embodiment, IC 130 can be embedded in controller 114. IC 130 can use the measured Vin_Sense, IOUT, and/or PHASE to determine adjustment amounts to deadtime parameter 207 and drive strength parameter 208. In one embodiment, IC 130 can determine the adjustment amounts and can latch the determined adjustment amounts in storage elements (e.g., latches) in controller 114 until a predetermined time to update deadtime parameter 207 and drive strength parameter 208. For example, IC 130 can periodically output an update signal and controller 114. In response to the update signal, controller 114 can retrieve the latched adjustment amounts to adjust deadtime parameter 207 and drive strength parameter 208.

Figure 3A:
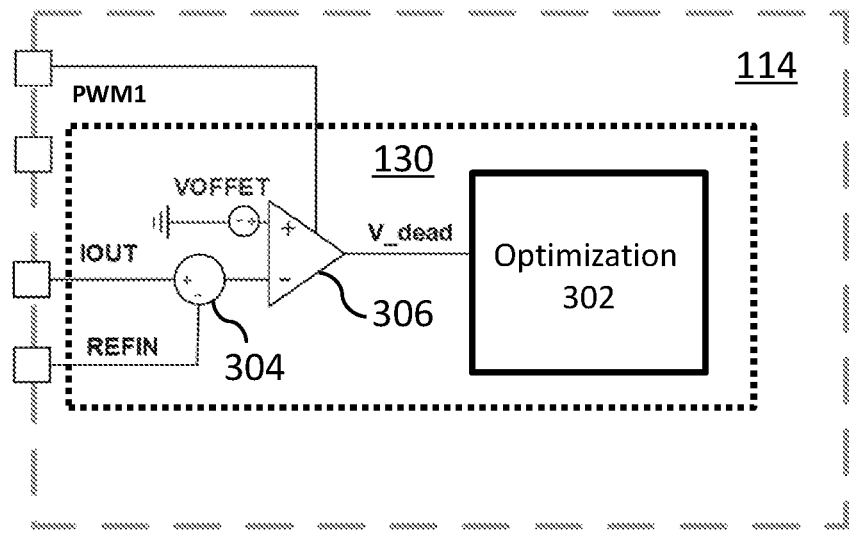
FIG. 3A is a diagram showing details of an integrated circuit that can optimize deadtime in one embodiment.

FIG. 3A is a diagram showing details of an integrated circuit that can optimize deadtime in one embodiment. The embodiment in FIG. 3A can use measured current information to adjust dead time. In the embodiment shown in FIG. 3A, IC 130 can include a comparator 306. A noninverting input terminal of comparator 306 can receive an offset voltage VOFFSET as input. An inverting input terminal of comparator 306 can receive an output voltage from a summation node 304. Summation node 304 can subtract a reference voltage REFIN from IOUT. VOFFSET can be set by controller 114 to be approximately the upper boundary of a predefined low current (e.g., 5 millivolts (mV)). A comparison of VOFFSET and a difference between IOUT and REFIN (e.g., IOUT−REFIN) can cause comparator 306 to output a voltage V_dead. A voltage level of V_dead can indicate whether load 104 (see FIG. 1 and FIG. 2) is a light load or a heavy load. In one embodiment, if IOUT−REFIN is less than VOFFSET, then load 104 may be a light load and IC 130 can perform an optimization process 302 to adjust deadtime parameter 207 to increase the deadtime of power stage 110 (see FIG. 1 and FIG. 2). If IOUT−REFIN is greater than VOFFSET, then load 104 may be a heavy load and IC 130 can perform optimization process 302 to adjust deadtime parameter 207 to optimize the deadtime of power stage 110. Details of optimization process 302 will be described in more detail with respect to FIG. 5.

Figure 3B:
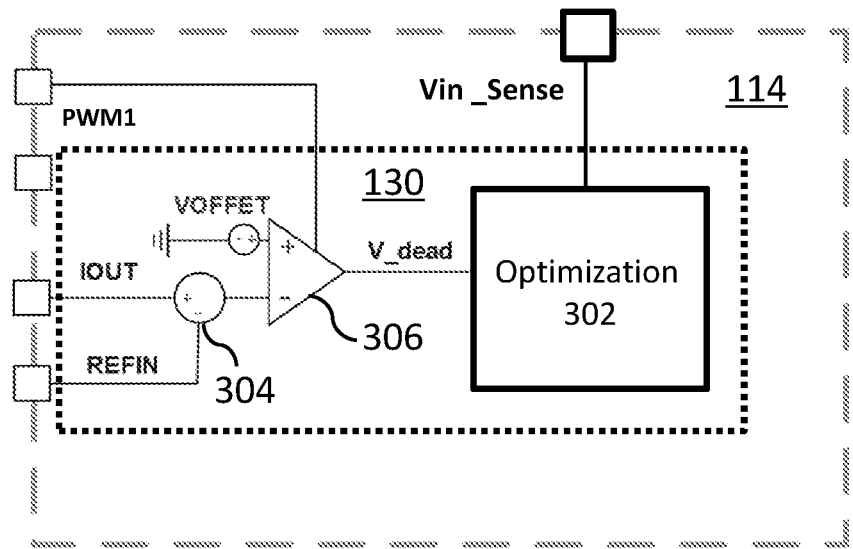
FIG. 3B is a diagram showing an embodiment of the integrated circuit of FIG. 3A.

In another embodiment shown in FIG. 3B, IC 130 can perform driver strength optimization and then dead time optimization by executing optimization process 302 based on input voltage Vin (Vin_Sense in FIG. 2) and sensed current information (e.g., IOUT-REFIN). IC 130 can first sense VIN, and when VIN>VREF (e.g., a voltage reference indicates high VIN when VIN>VREF), optimization process 302 can lower drive strength to reduce ringing. When VIN<VREF, optimization process 302 resets the drive strength parameter to a default value. Optimization process 302 can adjust the driver strength parameter and thereafter adjust the full load dead time parameter accordingly. Further, optimization process 302 can follow the same procedure to optimize full load and light load dead time based on current information IOUT-REFIN.

Figure 4A:
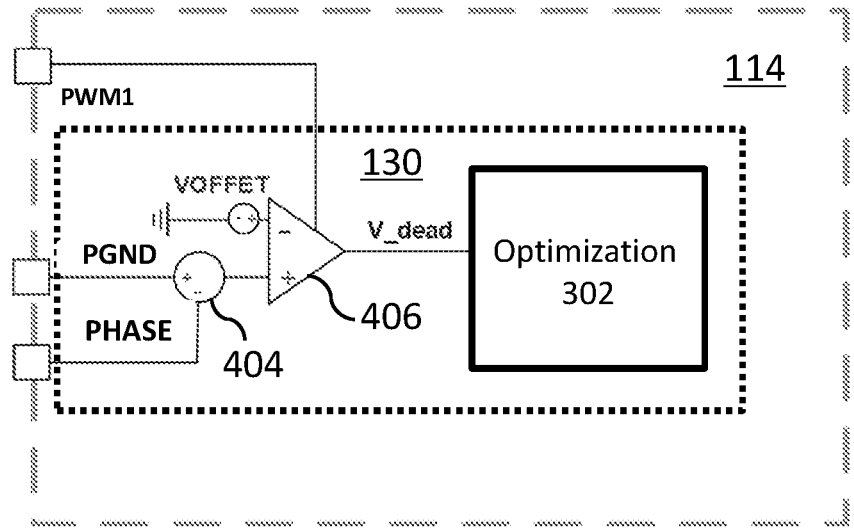
FIG. 4A is a diagram showing details of an integrated circuit that can optimize drive strength in one embodiment.
Figure 4B:
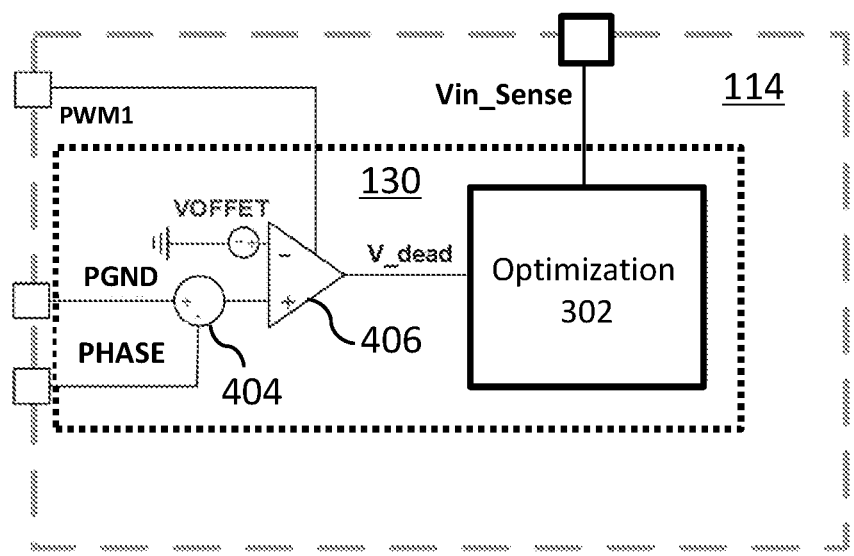
FIG. 4B is a diagram showing an embodiment of the integrated circuit of FIG. 4A.

FIG. 4A is a diagram showing details of another integrated circuit that can optimize dead time in one embodiment. The embodiment in FIG. 4A can use sensed switch node voltage to adjust dead time. In the embodiment shown in FIG. 4A, IC 130 can include a comparator 406. A noninverting input terminal of comparator 406 can receive VOFFSET as input. In one embodiment, a value or voltage level of VOFFSET can vary depending on whether measured current information (e.g., FIG. 1) or sensed switch n ode voltage (e.g., FIG. 4A) is used. An inverting input terminal of comparator 406 can receive an output voltage from a summation node 404. Summation node 404 can subtract a power-ground voltage (PGND) by a switch voltage labeled as PHASE (e.g., PHASE in FIG. 2) such that the output voltage (PGND−PHASE=(−1)*(PHASE−PGND)) from summation node 404 is proportional to a load current. A comparison of VOFFSET and a difference between PGND and PHASE (e.g., PGND−PHASE) can cause comparator 406 to output voltage V_dead. In one embodiment, if PGND-PHASE is less than VOFFSET, then load 104 may be a light load and IC 130 can perform optimization process 302 to adjust deadtime parameter 207 to increase the deadtime of power stage 110 (see FIG. 1 and FIG. 2). If PGND−PHASE is greater than VOFFSET, then load 104 may be a heavy load and IC 130 can perform optimization process 302 to adjust deadtime parameter 207 to optimize the deadtime of power stage 110. In an embodiment shown in FIG. 4B, IC 130 can perform drive strength optimization and then dead time accordingly by executing optimization process 302 based on input voltage Vin (Vin_Sense in FIG. 2) and sensed voltage PGND-PHASE.

Figure 5:
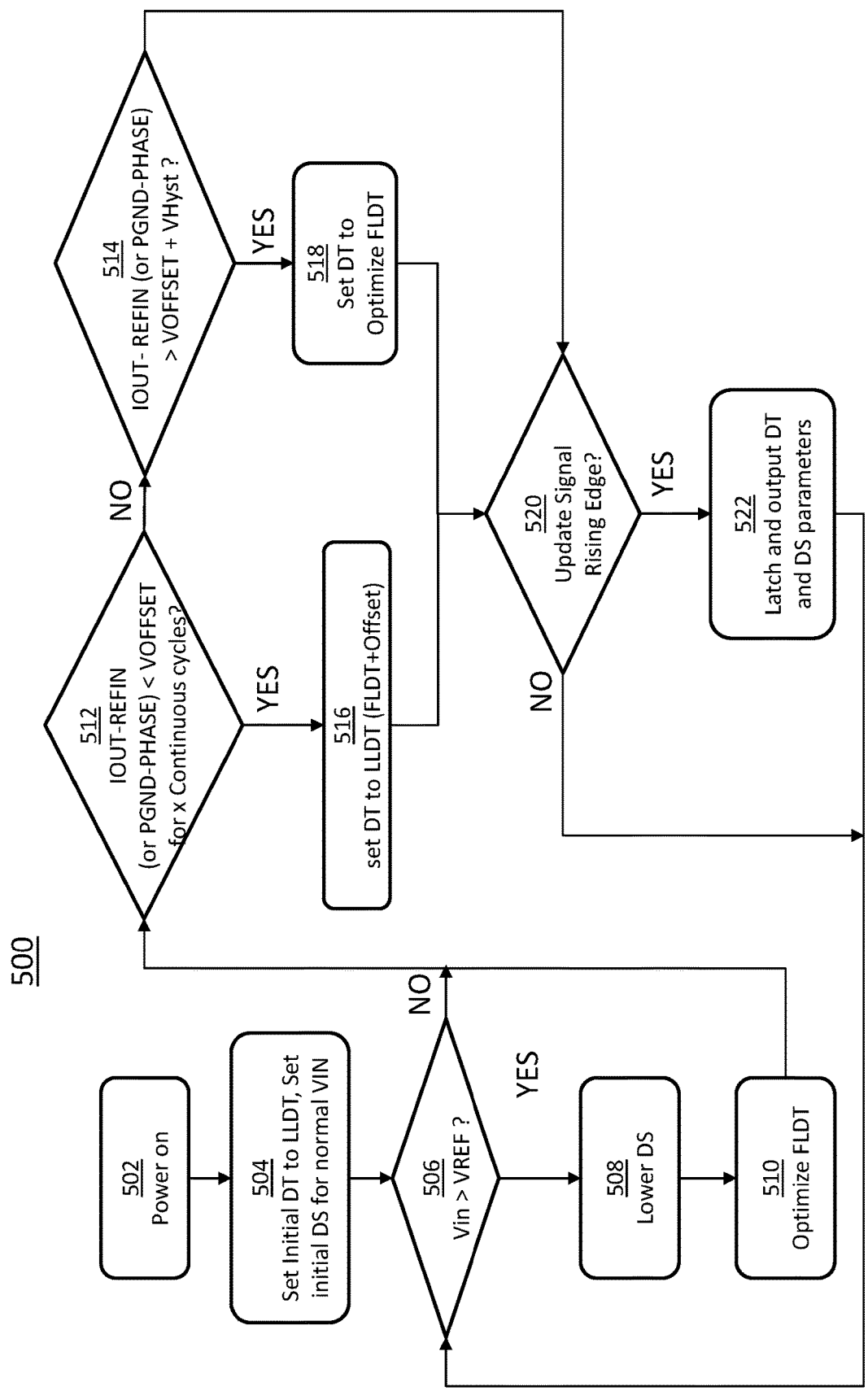
FIG. 5 is a flowchart of an example process that may implement power stage adaptive deadtime and drive strength in one embodiment.

FIG. 5 is a flowchart of an example process 500 that may implement power stage adaptive deadtime and drive strength in one embodiment. Process 500 can include one or more operations, actions, or functions as illustrated by one or more of blocks 502, 504, 506, 508, 510, 512, 514, 516, 518, 520, and/or 522. Although illustrated as discrete blocks, various blocks can be divided into additional blocks, combined into fewer blocks, eliminated, performed in different order, or performed in parallel, depending on the desired implementation.

In one embodiment, process 500 can be optimization process 302 shown in FIG. 3A to FIG. 4B. Process 500 can be implemented by, for example, controller 114, controller 124, and/or IC 130 shown in FIG. 1 to FIG. 4B. Process 500 can begin at block 502, where a power stage (e.g., power stage 110 or power stage 120 in FIG. 1) can be powered on. Process 500 can proceed from block 502 to block 504. At block 504, an initial deadtime (DT) of the power stage can be set to a light load deadtime (LLDT), an initial driver strength (DS) can be set to the optimal value for normal VIN. LLDT can be a predetermined deadtime that can be assigned to the power stage in response to a load (e.g., load 104 in FIG. 1 and FIG. 2) being a light load (e.g., drawing current lower than half of peak-to-peak inductor current ripple).

Process 500 can proceed from block 504 to block 506. At block 506, input voltage Vin can be compared with a reference voltage VREF. In one embodiment, reference voltage VREF can be a relatively high input voltage threshold, such as approximately 14V, or 14.5V for a voltage regulator of a datacenter Vcore Power. If input voltage Vin is greater than VREF (506: YES), then process 500 can proceed to block 508. If input voltage Vin is less than VREF (506: NO), then process 500 can proceed to block 512.

At block 508, a drive strength parameter (e.g., drive strength parameter 208 in FIG. 2) can be adjusted to lower a drive strength of drivers in the power stage, effectively lowering a switch speed of switching the pair of high side FET and low side FET of the power stage. At relatively higher input voltage (e.g., Vin>VREF), the drive strength can be lowered to reduce FET peak ringing and to avoid FET breakdown while maintaining relatively high efficiency. In an aspect, the drive strength to switch the FETs in the power stage varies inversely with the dead time. For example, lowered drive strength at block 508 can increase the deadtime. Hence, process 500 can proceed from block 508 to block 510. At block 510, in response to adjusting the drive strength, a deadtime parameter (e.g., deadtime parameter 207 in FIG. 2) can be adjusted and/or optimized to accommodate the lowered drive strength. For example, the full load dead time (FLDT) can be adjusted (e.g., increase or decrease) to provide an optimized efficiency of the power stage. The optimized FLDT may need to be set as short as possible, with certain margin, to prevent shoot-through at different conditions. In an aspect, a relatively lighter load may request longer deadtime and as the load increases, the deadtime can be reduced to achieve an optimized efficiency across the full load range.

To optimize the deadtime of the power stage, process 500 can proceed to block 512. At block 512, different types of information can be used to determine light load and full load. A first type of information can be a difference between the output voltage of the power stage (IOUT) and a reference voltage REFIN (see FIG. 3A and FIG. 3B), where IOUT−REFIN can be proportional to load current), and a second type of information can be a difference between PGND and a switch node voltage of the power stage (PHASE in FIGS. 2, 4A, 4B). The difference (e.g., first or second type of information) can be compared with an offset voltage VOFFSET (FIG. 3A to FIG. 4B) at block 512, and VOFFSET voltage can vary based on whether the first type or the second type of information is being used.

At block 512, if the difference is less than VOFFSET (512: YES), then process 500 can proceed to block 516. The difference IOUT−REFIN (or PGND−PHASE) being less than VOFFSET can indicate that a load drawing current from the power stage is a light load (e.g., drawing current lower than half of peak-to-peak inductor current ripple). At block 512, if the difference is greater than VOFFSET (512: NO), then process 500 can proceed to block 514. The difference IOUT−REFIN (or PGND−PHASE) being greater than VOFFSET can indicate that a load drawing current from the power stage is a heavy load.

In one embodiment, at block 512, the comparison of the difference can be performed for multiple consecutive or continuous operating cycles of the power stage. For example, the difference IOUT−REFIN, or PGND-PHASE, from X consecutive cycles can be compared with VOFFSET. If the difference is less than VOFFSET for the X consecutive cycles, then process 500 can proceed to block 516. If the difference is greater than VOFFSET in one cycle (not less than VOFFSET for all X consecutive cycles), then process 500 can proceed to block 514 and the comparison at block 512 can restart to compare the difference with VOFFSET for the next X consecutive cycles.

At block 516, in response to the comparison at block 512 indicating a presence of a light load, the deadtime parameter can be adjusted to increase the deadtime of the power stage. In one embodiment, at block 512, the deadtime FLDT is optimized from block 510. Therefore, at block 516, the light load deadtime of the power stage can be adding an addition of a predetermined amount of time to the FLDT. For example, a deadtime offset (e.g., approximately 6 to 10 nanoseconds) can be added to FLDT to set the light load deadtime at block 516.

At block 514, if the first type of information is being used in block 512, then the difference IOUT−REFIN can be compared with a sum of VOFFSET and a hysteresis voltage VHyst (e.g., VOFFSET+VHyst). If the second type of information is used in block 512, then the difference PGND−PHASE can be compared with the sum of VOFFSET and VHyst. Hysteresis voltage VHyst can be a voltage resulting from a hysteresis of the power stage. In one embodiment, a hysteresis voltage of at least approximately 10 millivolts can avoid bouncing or jittering at the power stage. At block 514, if the difference is greater than the sum of VOFFSET and VHyst (514: YES), then process 500 can proceed to block 518. At block 518, the deadtime parameter can be adjusted to optimize the deadtime of the power stage to the full load dead time (FLDT).

Process 500 can proceed from block 516 and/or block 518 to block 520. At block 520, an update signal (e.g., outputted by IC 130) can be monitored. In response to a rising edge of the update signal (520: YES), process 500 can proceed to block 522. Otherwise (520: NO), process 500 can return to block 506. At block 522, the deadtime parameters set in block 516 and/or block 518, and drive strength parameter set or adjusted in block 508, can be latched in a storage element (e.g., latches) of the power stage and outputted to the power stage controller (e.g., controller 114, 124) of the power stage. The controller that receives the updated deadtime and/or drive strength parameters can make adjustments, such as modifying PWM signals (e.g., modifying switched on delay or pulse width) being provided to drivers or configuring drive strength of the drivers. In one or more embodiments where more than one power stages are connected to a master controller, process 500 can be performed by an IC (e.g., IC 130) in each power stage individually such that each power stage can independently and adaptively adjust its own deadtime and drive strength to switch power transistors. For example, referring to system 100 shown in FIG. 1, power stage 110 and power stage 120 can each implement IC 130 to control deadtime and drive strength individually.

Figure 6:
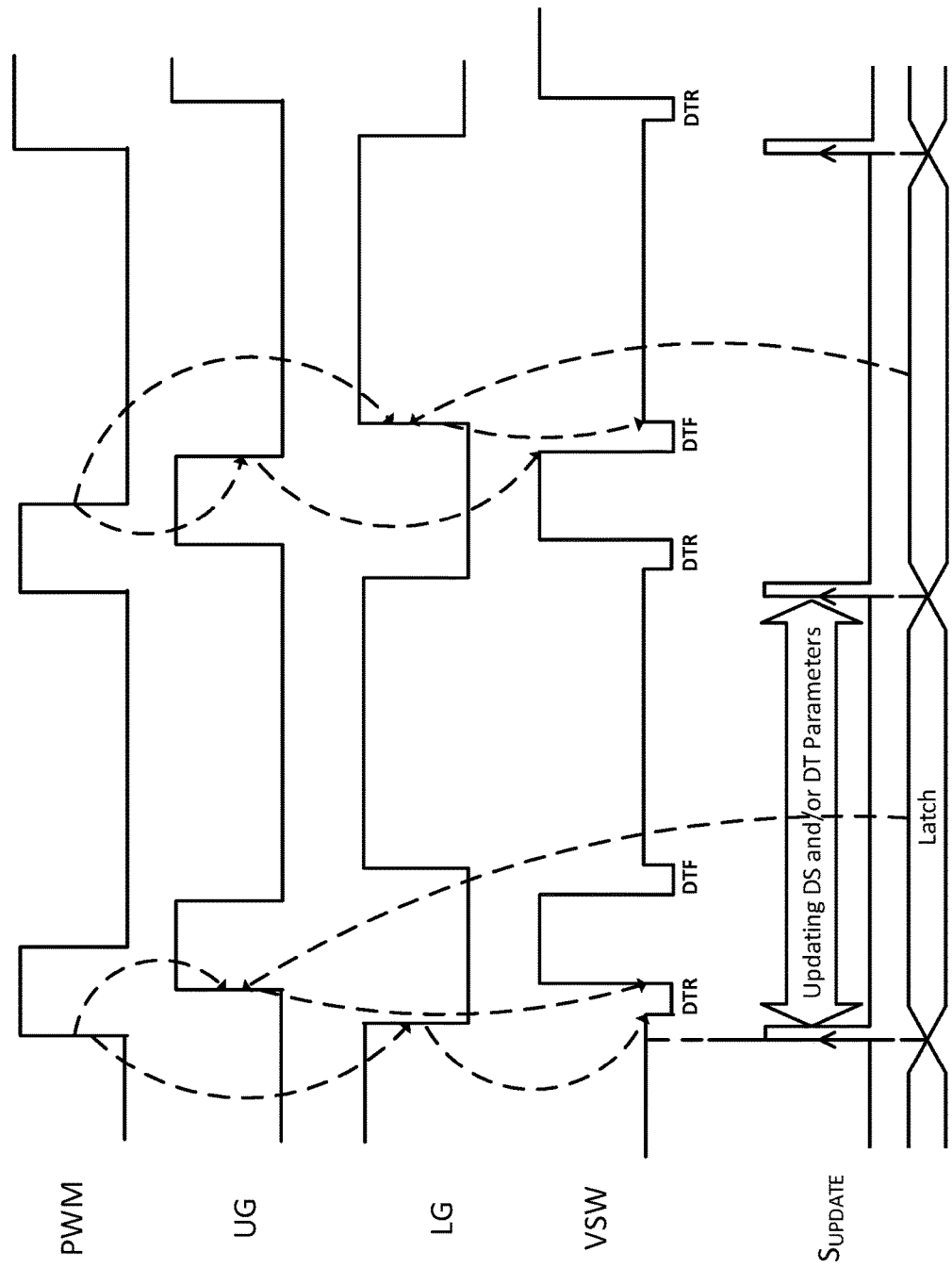
FIG. 6 is a diagram showing a timing diagram of an implementation of power stage adaptive deadtime and drive strength in one embodiment.

FIG. 6 is a diagram showing a timing diagram of an implementation of power stage adaptive deadtime and drive strength in one embodiment. In a timing diagram shown in FIG. 6, signal waveforms for a PWM signal (e.g., PWM1, PWM2 in FIG. 1), drive signals UG and LG (see FIG. 2), switch voltage VSW (see FIG. 2), and an update signal $S_{UPDATE}$ are shown. In response to a rising edge of the PWM signal, drive signal LG can switch to LOW and switch off a low side FET (see FIG. 2), and after a predetermined delay, drive signal UG can switch to HIGH to switch on a high side FET (see FIG. 2). The predetermined delay can be shown as a deadtime DTR on the VSW signal, where during DTR, switch voltage VSW can become negative at full load. After a lapse of a predetermined switched on time for the high side FET (e.g., pulse width of UG), UG can switch to LOW and LG can switch to HIGH after a lapse of a predetermined delay equivalent to deadtime DTF shown in VSW signal, where DTF can be equivalent to DTR. Similar to DTR, switch voltage VSW can become negative during deadtime DTF at full load.

As shown in the timing diagram of FIG. 6, the power stage controller will monitor Vin, PHASE and current continuously, and driver strength and dead time will be adjusted based on the sensed VIN, current or PHASE voltage accordingly. For example, if drive strength to turn on HS FET increases (e.g., faster), then deadtime (e.g., DTR, DTF) will be reduced. If drive strength to turn on HS decreases (e.g., slower), and deadtime (e.g., DTR, DTF) will be increased. To adjust the drive strength and deadtime without interrupting the switching, IC 130 (see FIG. 1) can output update signal $S_{UPDATE}$ to control a periodic update to the drive strength and deadtime. As shown in FIG. 6, in response to a rising edge of $S_{UPDATE}$, deadtime and/d drive strength parameters can be latched, and the latched parameters will adjust the driver strength and dead time for the following PWM cycle. Using $S_{UPDATE}$ to control a periodic update of deadtime and/or drive strength to avoid immediate update during deadtimes DTRs or DTFs or at FETs switching. Update of deadtime and/or drive strength during a DTR or a DTF or at FET switching can cause circuit malfunction and affecting the switching of high side and low side FETs.

FIG. 7 is a flowchart of another example process 700 that may implement power stage adaptive deadtime and drive strength in one embodiment. Process 700 in FIG. 7 may be implemented using, for example, system 100 discussed above. An example process may include one or more operations, actions, or functions as illustrated by one or more of blocks 702, 704, 706, and/or 708. Although illustrated as discrete blocks, various blocks may be divided into additional blocks, combined into fewer blocks, eliminated, performed in different order, or performed in parallel, depending on the desired implementation.

Process 700 can be performed by a controller of a power stage. In one embodiment, the power stage can be among a plurality of power stages being controlled by a master controller. In one embodiment, process 700 can be performed by controllers of each individual power stage among the plurality of power stages. Process 700 can begin at block 702. At block 702, a controller of a power stage can measure an input voltage being provided to a power stage. Process 700 can proceed from block 702 to block 704. At block 704, the controller of the power stage can measure a switch voltage of the power stage. Process 700 can proceed from block 704 to block 706. At block 706, the controller of the power stage can measure an output current of the power stage. In one embodiment, blocks 702, 704, 706 can be performed simultaneously.

Process 700 can proceed from block 706 to block 708. At block 708, an integrated circuit that may be embedded in the controller can adjust at least one of a deadtime parameter and a drive strength parameter of the power stage based on at least one of the measured input voltage, switch voltage, and output current.

In one embodiment, the integrated circuit can be configured to, in response to the input voltage being greater than a predetermined reference voltage, adjust the drive strength parameter to reduce the drive strength of the drivers in the power stage. In one embodiment, the integrated circuit can be configured to adjust the deadtime parameter of the power stage based on the output current in response the power stage operating under a voltage mode. In one embodiment, the integrated circuit can be configured to adjust the deadtime parameter of the power stage based on the switch node voltage.

In one embodiment, the integrated circuit can be configured to, in response to the input voltage being greater than a predetermined reference voltage, adjust the drive strength parameter to reduce the drive strength of the drivers in the power stage. The integrated circuit can be configured to, compare the output current with a predetermined offset voltage. The integrated circuit can be configured to, in response to the output current being less than the predetermined offset voltage, adjust the deadtime parameter to increase the deadtime of the power stage.

In one embodiment, the integrated circuit can be configured to adjust the drive strength parameter to reduce the drive strength of the drivers in the power stage. The integrated circuit can be configured to, compare the switch node voltage with a predetermined offset voltage. The integrated circuit can be configured to, in response to the switch node voltage being less than the predetermined offset voltage, adjust the deadtime parameter to increase the deadtime of the power stage.

In one embodiment, the integrated circuit can be configured to output an update signal periodically. The integrated circuit can be configured to latch the adjusted deadtime parameter and drive strength parameter. The integrated circuit can be configured to, in response to a rising edge of the output signal, output the adjusted deadtime parameter and drive strength parameter to the controller.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present invention have been presented for purposes of illustration and description but are not intended to be exhaustive or limited to the invention in the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
   a controller in a power stage; and
   an integrated circuit in the power stage configured to:
     initialize a deadtime parameter of the power stage;
     adjust a drive strength parameter based on an input voltage being provided to the power stage;
     in response to adjusting the drive strength parameter, determine whether to maintain the initialized deadtime parameter or to adjust the initialized deadtime parameter based on at least one of:
       a switch node voltage of the power stage, and
       an output current of the power stage; and
     latch the adjusted drive strength parameter and one of the maintained initialized deadtime parameter and the adjusted initialized deadtime parameter in storage elements;
     generate a periodic update signal;
     wait for a rising edge of the periodic update signal;
     in response to an occurrence of the rising edge of the periodic update signal, output the latched deadtime parameter and the latched drive strength parameter to a controller in the power stage;
   the controller in the power stage being configured to:
     adjust a deadtime of the power stage using one of the maintained initialized deadtime parameter and the adjusted initialized deadtime parameter latched in the storage elements; and
     adjust a drive strength of drivers in the power stage using the adjusted drive strength parameter latched in the storage elements.

2. The apparatus of claim 1, wherein the integrated circuit is configured to, in response to the input voltage being greater than a predetermined reference voltage, adjust the drive strength parameter to reduce the drive strength of the drivers in the power stage.

3. The apparatus of claim 1, wherein the integrated circuit is configured to adjust the deadtime parameter of the power stage based on the output current.

4. The apparatus of claim 1, wherein the integrated circuit is configured to:
   in response to the input voltage being greater than a predetermined reference voltage, adjust the drive strength parameter to reduce the drive strength of the drivers in the power stage;
   optimize the initialized deadtime parameter to a full load deadtime (FLDT);
   compare the output current with a predetermined offset voltage; and
   in response to the output current being less than the predetermined offset voltage, adjust the FLDT to increase the deadtime of the power stage to the initialized deadtime parameter.

5. The apparatus of claim 1, wherein the integrated circuit is configured to adjust the deadtime parameter of the power stage based on the switch node voltage.

6. The apparatus of claim 1, wherein the integrated circuit is configured to:
   in response to the input voltage being greater than a predetermined reference voltage, adjust the drive strength parameter to reduce the drive strength of the drivers in the power stage;
   optimize the initialized deadtime parameter to a full load deadtime (FLDT);
   compare the switch node voltage with a predetermined offset voltage; and
   in response to the switch voltage being less than the predetermined offset voltage, adjust the FLDT to increase the deadtime of the power stage to the initialized deadtime parameter.

7. A system comprising:
   a plurality of power stages, wherein each power stage among the plurality of the power stages comprises:
     a first driver configured to drive a high side transistor of a power stage;
     a second driver configured to drive a low side transistor of the power stage; and
     a controller configured to:
       initialize a deadtime parameter of the power stage;
       adjust a drive strength parameter based on an input voltage being provided to the power stage;
       in response to adjusting the drive strength parameter, determine whether to maintain the initialized deadtime parameter or to adjust the initialized deadtime parameter based on at least one of:
         a switch node voltage of the power stage, and
         an output current of the power stage;
       latch the adjusted drive strength parameter and one of the maintained initialized deadtime parameter and the adjusted initialized deadtime parameter in storage elements;
       generate a periodic update signal;
       wait for a rising edge of the periodic update signal; and
       in response to an occurrence of the rising edge of the periodic update signal:
         adjust a deadtime of the power stage using one of the maintained initialized deadtime parameter and the adjusted initialized deadtime parameter latched in the storage elements; and
         adjust a drive strength of the first driver and the second driver using the adjusted drive strength parameter latched in the storage elements.

8. The system of claim 7, wherein the controller is configured to, in response to the input voltage being greater than a predetermined reference voltage, adjust the drive strength parameter to reduce the drive strength of the first driver and the second driver.

9. The system of claim 7, wherein the controller is configured to adjust the deadtime parameter of the power stage based on the output current.

10. The system of claim 7, wherein the controller is configured to:
    in response to the input voltage being greater than a predetermined reference voltage, adjust the drive strength parameter to reduce the drive strength of the first driver and the second driver;
optimize the initialized deadtime parameter to a full load deadtime (FLDT);
compare the output current with a predetermined offset voltage; and
in response to the output current being less than the predetermined offset voltage, adjust the FLDT to increase the deadtime of the power stage to the initialized deadtime parameter.

11. The system of claim 7, wherein the controller is configured to adjust the deadtime parameter of the power stage based on the switch node voltage.

12. The system of claim 7, wherein the controller is configured to:
in response to the input voltage being greater than a predetermined reference voltage, adjust the drive strength parameter to reduce the drive strength of the first driver and the second driver;
optimize the initialized deadtime parameter to a full load deadtime (FLDT);
compare the switch voltage with a predetermined offset voltage; and
in response to the switch voltage being less than the predetermined offset voltage, adjust the FLDT to increase the deadtime of the power stage to the initialized deadtime parameter.

13. A method for operating a voltage regulator, the method comprising:
measuring an input voltage being provided to a power stage;
measuring a switch node voltage of the power stage;
measuring an output current of the power stage;
initialize a deadtime parameter of the power stage;
adjusting a drive strength parameter of the power stage based on the measured input voltage;
in response to adjusting the drive strength parameter, determining whether to maintain the initialized deadtime parameter or to adjust the initialized deadtime parameter of the power stage based on at least one of the measured switch node voltage and the measured output current;
latching the adjusted drive strength parameter and one of the maintained initialized deadtime parameter and the adjusted initialized deadtime parameter in storage elements;
generating a periodic update signal;
wait for a rising edge of the periodic update signal; and
in response to an occurrence of the rising edge of the periodic update signal:
adjusting a deadtime of the power stage using one of the maintained initialized deadtime parameter and the adjusted initialized deadtime parameter latched in the storage elements; and
adjusting a drive strength of drivers in the power stage using the adjusted drive strength parameter latched in the storage elements.

14. The method of claim 13, further comprising adjusting the deadtime parameter of the power stage based on the output current.

15. The method of claim 13, further comprising:
in response to the input voltage being greater than a predetermined reference voltage, adjusting the drive strength parameter to reduce the drive strength of the drivers in the power stage;
optimizing the initialized deadtime parameter to a full load deadtime (FLDT);
comparing the output current with a predetermined offset voltage; and
in response to the output current being less than the predetermined offset voltage, adjusting the FLDT to increase the deadtime of the power stage to the initialized deadtime parameter.

16. The method of claim 13, further comprising adjusting the deadtime parameter of the power stage based on the switch node voltage.

17. The method of claim 13, further comprising:
in response to the input voltage being greater than a predetermined reference voltage, adjusting the drive strength parameter to reduce the drive strength of the drivers in the power stage;
optimizing the initialized deadtime parameter to a full load deadtime (FLDT);
comparing the switch voltage with a predetermined offset voltage; and
in response to the switch voltage being less than the predetermined offset voltage, adjusting the FLDT to increase the deadtime of the power stage to the initialized deadtime parameter.

* * * * *